(12) United States Patent
Boss et al.

(10) Patent No.: US 8,088,033 B2
(45) Date of Patent: Jan. 3, 2012

(54) MULTI-STAGE GEARBOX

(75) Inventors: Ralf Boss, Kressbronn (DE); Gerhard Gumpoltsberger, Friedrichshafen (DE); Hans-Peter Freudenreich, Griesingen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 434 days.

(21) Appl. No.: 12/518,953

(22) PCT Filed: Dec. 6, 2007

(86) PCT No.: PCT/EP2007/063444
§ 371 (c)(1),
(2), (4) Date: Jul. 2, 2009

(87) PCT Pub. No.: WO2008/074647
PCT Pub. Date: Jun. 26, 2008

(65) Prior Publication Data
US 2010/0048345 A1  Feb. 25, 2010

(30) Foreign Application Priority Data

Dec. 19, 2006 (DE) .......................... 10 2006 059 907

(51) Int. Cl.
*F16H 3/44* (2006.01)
(52) U.S. Cl. .................. 475/282; 475/288; 475/290
(58) Field of Classification Search .......... 475/275–291, 475/296, 330
See application file for complete search history.

(56) References Cited

U.S. PATENT DOCUMENTS

| | | | |
|---|---|---|---|
| 4,089,239 A | 5/1978 | Murakami et al. | |
| 4,395,925 A | 8/1983 | Gaus | |
| 6,139,463 A | 10/2000 | Kasuya et al. | |
| 6,634,980 B1 | 10/2003 | Ziemer | |
| 6,860,831 B2 | 3/2005 | Ziemer | |
| 7,794,351 B2 * | 9/2010 | Wittkopp et al. | 475/275 |
| 7,998,015 B2 * | 8/2011 | Carey et al. | 475/282 |
| 2004/0048716 A1 | 3/2004 | Ziemer | |
| 2004/0097324 A1 | 5/2004 | Ziemer | |
| 2006/0166779 A1 | 7/2006 | Klemen | |
| 2010/0069191 A1 * | 3/2010 | Swales et al. | 475/5 |
| 2010/0144486 A1 * | 6/2010 | Hart et al. | 475/275 |

FOREIGN PATENT DOCUMENTS

| | | |
|---|---|---|
| DE | 2936969 | 4/1981 |
| DE | 3123868 | 3/1982 |
| DE | 19912480 | 9/2000 |
| DE | 19949507 | 4/2001 |
| DE | 10213820 | 5/2003 |
| DE | 10115983 | 5/2004 |

(Continued)

*Primary Examiner* — Roger Pang
(74) *Attorney, Agent, or Firm* — Davis & Bujold, P.L.L.C.

(57) ABSTRACT

A transmission having gearsets (P1-P4), shafts (1-8) and shifting elements (03, 04, 05, 48, 67, 78). Shaft (1) couples an input and carrier of gearset (P1), shaft (2) couples the output and carriers of gearsets (P3, P4), shaft (3) couples the ring gear of gearset (P2) and the sun gear of gearset (P1), shaft (4) couples the ring gear of gearset (P3) and the sun gear of gearset (P4), shaft (5) couples the ring gear of gearset (P4), shaft (6) couples the sun gear of gearset (P2) and the ring gear of gearset (P1), shaft (7) is connected to the sun gear of gearset (P3), and shaft (8) is connected to the carrier of gearset (P2). Shafts (3, 4 and 5) can each engage housing (G) by way of respective brakes (03, 04, 05), clutches (48; 67; 78) can couple, respectively, shafts (4, 8; 6, 7; 7, 8).

23 Claims, 3 Drawing Sheets

FOREIGN PATENT DOCUMENTS

| | | |
|---|---|---|
| DE | 10115987 | 3/2005 |
| EP | 0434525 | 6/1991 |
| GB | 2177764 | 1/1987 |
| WO | 8300200 | 1/1983 |
| WO | 02/079669 | 10/2002 |

\* cited by examiner

US 8,088,033 B2

MULTI-STAGE GEARBOX

This application is a National Stage completion of PCT/US2007/063444 filed Dec. 6, 2007 which claims priority from German application no. 10 2006 059 907.1 filed Dec. 19, 2006.

FIELD OF INVENTION

The present invention relates to a multi-speed transmission in planetary design, particularly an automatic transmission for a motor vehicle.

BACKGROUND OF INVENTION

According to the state of the art, automatic transmissions, particularly for motor vehicles, comprise planetary gear sets, which are shifted using friction and/or shifting elements, such as clutches and brakes, and which are typically connected to a starting element that is subject to a slip effect and optionally provided with a converter lock-up clutch, for example a hydrodynamic torque converter or a fluid clutch.

A transmission of this type is described in EP 0 434 525 A1. It basically includes an input shaft and an output shaft, which are arranged parallel to each other, a double planetary gear set arranged concentrically in relation to the output shaft, and five control elements in the form of three clutches and two brakes, the selective operation of which in pairs determines the different gear ratios between the input shaft and the output shaft. This transmission has a front-mounted gear set and two power paths, so that by the selective engagement in pairs of the five control elements, six forward gears are obtained.

In the first power path, two clutches are required for transmitting the torque from the front-mounted gear set to two elements of the double planetary gear set. These elements are arranged in the power flow direction substantially downstream of the front-mounted gear set in the direction of the double planetary gear set. A further clutch is provided in the second power path which detachably connects this path to a further element of the double-ratio planetary gear set. The clutches are arranged such that the inner disk carrier forms the output end.

Furthermore, from the published prior art U.S. Pat. No. 6,139,463 a compact multi-speed transmission in planetary design, particularly for a motor vehicle is known, which has two planetary gear sets and one front-mounted gear set as well as three clutches and two brakes. In this known multi-speed transmission, two clutches C-1 and C-3 are provided in a first power path for transmitting the torque from the front-mounted gear set to the two planetary gear sets. The outer disk carrier and/or the cylinder or piston and pressure compensation side of the clutch C-3 are connected to a first brake B-1. Furthermore, the inner disk carrier of the third clutch C-3 is connected to the cylinder and/or piston and pressure compensation sides of the first clutch C-1, the inner disk carrier of the first clutch C-1 being arranged on the output side and connected to a sun gear of the third planetary gear set.

A multi-speed transmission is also known from DE 199 49 507 A1 by the applicant, according to which on the drive shaft two non-shiftable, front-mounted gear sets are provided, which on the output side generate two rotational speeds which, in addition to the rotational speed of the input shaft, can be selectively switched by engaging the control elements to a shiftable double planetary gear set acting upon the output shaft such that, for changing from one gear to the next higher or lower gear of the two actuated control elements, only one control element must be engaged or disengaged.

DE 199 12 480 A1 discloses an automatically shiftable motor vehicle transmission with three planet carrier-mounted planetary gear sets as well as three brakes and two clutches for switching between six forward gears and one reverse gear and with one drive shaft and one output shaft. The automatically shiftable motor vehicle transmission is configured such that the drive shaft is directly connected to the sun gear of the second planetary gear set and that the drive shaft can be connected, via the first clutch, to the sun gear of the first planetary gear set and/or, via the second clutch, to the planet carrier of the first planetary gear set. In addition, or as an alternative, the sun gear of the first planetary gear set can be connected, via the first brake, to the housing of the transmission and/or the planet carrier of the first planetary gear set can be connected, via the second brake, to the housing and/or the sun gear of the third planetary gear set, via the third brake, to the housing.

Furthermore, DE 102 13 820 A1 discloses a multi-speed automatic transmission, comprising a first input path T1 of a first transmission ratio, an input path T2, which has a larger transmission ratio than the input path T1, a planetary gear set of four elements, wherein the four elements are a first element, a second element, a third element, and a fourth element following an order of elements on a speed diagram, a clutch C-2 transmitting rotation from the input path T2 to the first element S3, a clutch C-1 transmitting the rotation from the input path T2 to the fourth element S2, a clutch C-4 transmitting rotation from the input path T1 to the first element, a clutch C-3 transmitting the rotation from the input path T1 to the second element C3, a brake B-1 engaging the fourth element, a brake B-2 engaging the second element, and an output member coupled to the third element R3.

A multi-speed transmission is described within the framework of DE 101 15 983 A1 by the applicant, comprising a drive shaft that is linked to a front-mounted gear set, an output shaft that is connected to a rear-mounted gear set, and a maximum of seven shifting elements, through the selective shifting of which at least seven forward gears can be shifted without range shifting. The front-mounted gear set is formed by a front-mounted planetary gear set or a maximum of two non-shiftable front-mounted planetary gear sets linked to the first front-mounted planetary gear set, wherein the rear-mounted gear set is configured as a two-planet carrier four-shaft transmission with two shiftable rear-mounted planetary gear sets and has four free shafts. The first free shaft of this two-planet carrier four-shaft transmission is connected to the first shifting element, the second free shaft to the second and third shifting elements, the third free shaft to the fourth and fifth shifting elements and the fourth free shaft is connected to the output shaft. According to the invention, a multi-speed transmission with a total of six shifting elements is proposed, which connects the third free shaft or the first free shaft of the rear-mounted gear set additionally to a sixth shifting element. For a multi-speed transmission with a total of seven control elements, it is proposed according to the invention that the third free shaft is additionally connected to a sixth control element D' and the first free shaft additionally to a seventh control element.

A multi-speed transmission with at least seven gears is described within the framework of DE 101 15 987. In addition to the input shaft and the output shaft, this transmission comprises a non-shiftable front-mounted gear set and shiftable rear-mounted gear set in the form of a two-carrier four-shaft transmission. The front-mounted gear set comprises a first planetary gear set, which in addition to the input rotational speed of the input shaft also provides a second rotational speed, which may optionally be shifted to the rear-mounted gear set. The rear-mounted gear set comprises two engageable planetary gear sets, which can shift at least seven gears using the six shift elements, forming two power paths. Here during each shifting operation, advantageously range shifting is avoided. A 9-gear multi-speed transmission is furthermore known from DE 29 36 969; it comprises eight shift elements and four gear sets.

Automatic motor vehicle transmissions in planetary design in general have previously been described in the state of the art on many occasions and are subject to continuous refinements and improvements. These transmissions should have low complexity, in particular require a small number of shifting elements, and avoid double-shifts when shifting sequentially, so that always only one shifting element is engaged when shifting in defined gear groups.

Previously planetary transmissions generally only had one reverse gear, however planetary transmissions are also known to have additional reverse gears, which can either be shifted using the existing shifting elements in the planetary transmission, or are implemented by means of an additional reverse gear set. The disadvantage with the known planetary transmissions is accordingly either the insufficient number and insufficient gear ratios of the reverse gears or the constructional expenditure required for realizing the reverse gears.

SUMMARY OF INVENTION

The present invention is therefore based upon the objective of proposing a multi-speed transmission of the type mentioned above, which has at least six forward gears and at least three reverse gears with sufficient gear ratios, in which the constructional expenditure and the size and/or the weight are optimized, and the efficiency with respect to drag and gearing losses is improved in addition. Furthermore, low torque is to act on the shifting elements and planetary gear sets in the multi-speed transmission of the invention, and the rotational speeds of the shafts, shifting elements and planetary gear sets are to be kept as low as possible. In particular, the transmission according to the invention is to be suited for installation in commercial vehicles and work machines in order to make possible both sufficient forward gear tractive force and speed and sufficient reverse gear tractive force and speed.

According to the invention, a multi-speed transmission in planetary design is proposed, which has an input and an output which are arranged in a housing. Furthermore, at least four planetary gear sets—hereafter referred to as the first, second, third and fourth planetary gear sets—, at least eight rotatable shafts—hereafter referred to as the first, second, third, fourth, fifth, sixth, seventh and eighth shafts—and at least six shifting elements, comprising brakes and clutches, are provided. The selective engagement of these components creates different gear ratios between the input and the output so that preferably six forward gears and three reverse gear can be implemented.

According to the invention, it is provided in connection with the multi-speed transmission that the first shaft is permanently connected to the input An and the planet carrier of the first planetary gear set, whereby the second shaft is permanently connected to the output, the planet carrier of the third planetary gear set, and the planet carrier of the fourth planetary gear set. Furthermore, the third shaft is permanently connected to the ring gear of the second planetary gear set and the sun gear of the first planetary gear set, whereby the fourth shaft is permanently connected to the ring gear of the third planetary gear set and the sun gear of the fourth planetary gear set. The fifth shaft is permanently connected to the ring gear of the fourth planetary gear set, whereby the sixth shaft is permanently connected to the sun gear of the second planetary gear set and the ring gear of the first planetary gear set, the seventh shaft is permanently connected to the sun gear of the third planetary gear set, and the eighth shaft is permanently connected to the planet carrier of the second planetary gear set.

In this connection, the third, fourth, and fifth shafts can each be coupled to a housing of the transmission by way of a brake. Furthermore, it is provided that a clutch detachably connects the fourth shaft to the eighth shaft, that a further clutch detachably connects the sixth shaft to the seventh shaft, and that a further clutch detachably connects the seventh shaft to the eighth shaft.

The configuration of the multi-speed transmission according to the invention produces suitable gear ratios, particularly for commercial vehicles and work machines. In addition, the multi-speed transmission according to the invention allows a considerably decreased complexity to be achieved, due to the low number of shifting elements, preferably three brakes and three clutches. It is advantageously possible with the multi-speed transmission according to the invention to start driving with a hydrodynamic converter, a hydrodynamic clutch, an external starting clutch or with other suitable external starting elements. It is also conceivable to allow a starting operation with a starting element integrated in the transmission. A shifting element, which is actuated in the first forward gear and in the first reverse gear, is preferably suited.

In addition, good efficiency in the main driving gears with regard to drag and gearing losses can be achieved with the multi-speed transmission according to the invention.

Furthermore, low torques are present in the shifting elements and in the planetary gear sets of the multi-speed transmission, thus advantageously reducing the wear on the multi-speed transmission. In addition, the low torques correspondingly make small dimensions possible, allowing reductions in the required installation space and the corresponding costs. Also, the rotational speeds in the shafts, shifting elements and planetary gear sets are low. In addition, the transmission according to the invention is designed such that it can be adapted to different drive train configurations, both in power flow direction and with regard to space.

BRIEF DESCRIPTION OF DRAWINGS

The invention will be explained in more detail hereafter by exemplary embodiments illustrated in the figures, wherein.

DETAILED DESCRIPTION OF DRAWINGS

Figures 1, 2:
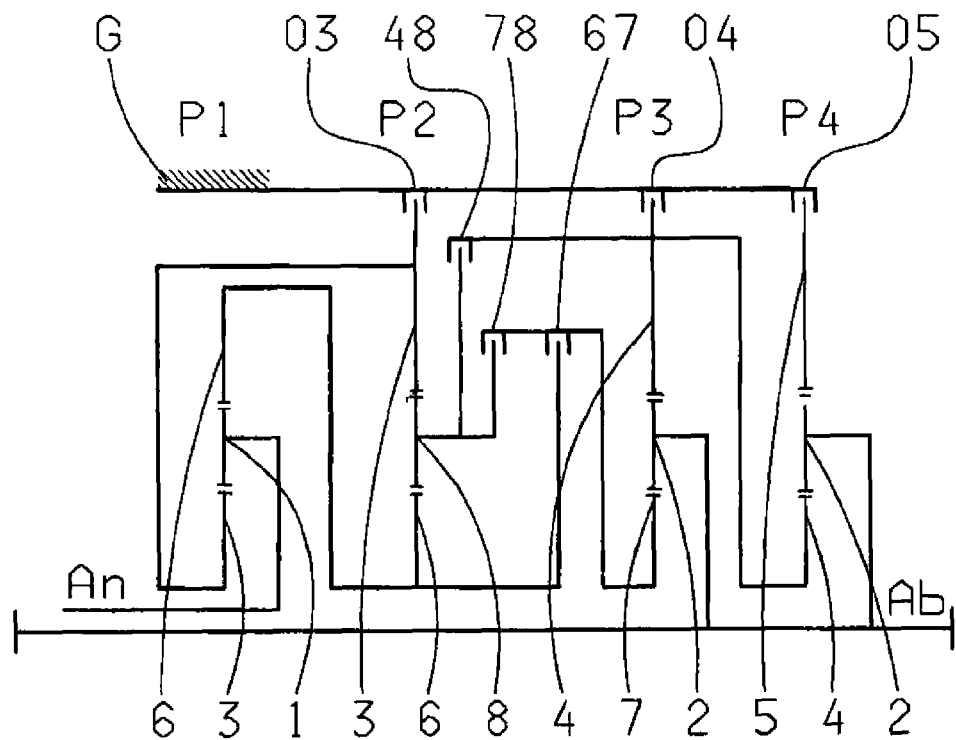
FIG. 1 is a schematic illustration of a preferred embodiment of a multi-speed transmission according to the invention.
FIG. 2 is an exemplary shifting pattern for the multi-speed transmission according to the invention from FIG. 1.

FIG. 1 shows a multi-speed transmission according to the invention comprising an input shaft An and an output shaft Ab, which are arranged in a housing G. Four planetary gear sets P1, P2, P3, P4 are provided, which are preferably configured as minus planetary gear sets and arranged in the sequence of P1, P2, P3, P4 in the axial direction.

As can be seen from FIG. 1, only six shifting elements, namely three brakes 03, 04, 05 and three clutches 48, 67 and 78, are provided. With these shifting elements, selective engagement of preferably six forward gears and three reverse gears can be implemented. The multi-speed transmission according to the invention has a total of eight rotatable shafts, namely the shafts 1, 2, 3, 4, 5, 6, 7 and 8.

According to the invention, it is provided in the multi-speed transmission according to FIG. 1 that the shaft 1 is permanently connected to the input An and the planet carrier of the first planetary gear set P1, the shaft 2 is permanently connected to the output Ab, the planet carrier of the third planetary gear set P3, and the planet carrier of the fourth planetary gear set P4. The shaft 3 is permanently connected to the ring gear of the second planetary gear set P2 and to the sun gear of the first planetary gear set P1, the shaft 4 is permanently connected to the ring gear of the third planetary set P3 and the sun gear of the fourth planetary gear set P4. Furthermore, the shaft 5 is permanently connected to the ring gear of the fourth planetary gear set P4, the shaft 6 is permanently connected to the sun gear of the second planetary gear set P2 and to the ring gear of the first planetary gear set P1, the shaft 7 is permanently connected to the sun gear of the third planetary gear set P3, and the shaft 8 is permanently connected to the planet carrier of the second planetary gear set P2.

As is apparent from FIG. 1, the shaft 3 can be coupled to a housing G of the transmission by way of the brake 03, the shaft 4 can likewise be coupled to the housing G of the transmission by way of the brake 04, whereby the shaft 5 can be coupled to the housing G of the transmission by way of the brake 05. Furthermore, it is provided according to the invention that the clutch 48 detachably connects the shaft 4 to the shaft 8, that the clutch 67 detachably connects the shaft 6 to the shaft 7, and that the clutch 78 detachably connects the shaft 7 to the shaft 8.

In this connection, the clutches 78 and 67 can be axially arranged between the second planetary gear set P2 and the third planetary gear set P3. Advantageously, the clutches 78 and 67 can be multi-disk clutches and have a common outer disk carrier.

Furthermore, viewed axially, the clutch 48 is arranged between the second planetary gear set P2 and the third planetary gear set P3, whereby the outer disk carrier thereof, viewed radially, can be located above the clutches 78 and 67.

The spatial configuration of the shifting elements can be arbitrary and is only limited by the dimensions and outer shape, so that the actual configuration of the elements can vary significantly from the configuration shown, depending on the design requirement.

FIG. 2 shows a shifting pattern of the multi-speed transmission according to FIG. 1 by way of example. For each gear, three shifting elements are engaged. The shifting pattern shows by way of example the respective gear ratios i of the individual gear steps and the resulting progressive ratios phi.

The shifting pattern also shows that double-shifts and/or range shifts are avoided when shifting sequentially because two adjoining gear steps use two common shifting elements. In the shifting pattern shown, the sixth gear is configured as a direct gear.

According to the invention, depending on the shifting logic, different gear steps may be obtained from the same gear pattern, allowing application- and/or vehicle-specific variations.

The first forward gear is defined by engagement of the brake 04, the brake 03, and the clutch 78, the second gear by engagement of the brake 04, the clutch 67, and the clutch 78, and the third gear is defined by engagement of the brake 04, the clutch 67, and the brake 03. Furthermore, the fourth gear is defined by engagement of the clutch 48, the brake 04, and the clutch 67, the fifth gear by engagement of the clutches 48 and 67 and the brake 03, and the sixth gear is defined by engagement of the clutches 48, 67, and 78. As is apparent from the shifting pattern, the first reverse gear is defined by engagement of the brakes 03 and 05 and the clutch 78, the second reverse gear by engagement of the brake 05 and the clutches 67 and 78, and the third reverse gear is defined by engagement of the brakes 03 and 05 and the clutch 67.

Figure 3:
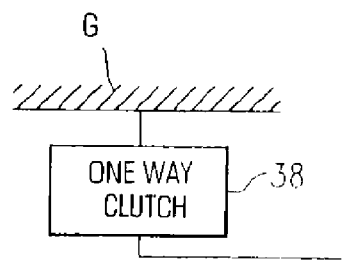
FIG. 3 is a schematic illustration of a one way clutch arranged on a shaft between the shaft and A housing.

It is possible according to the invention, as seen in FIG. 3, to provide additional one-way clutches 38 in suitable locations of the multi-speed transmission, for example between a shaft and a housing of the transmission, or if need be to connect two shafts.

Figure 4:
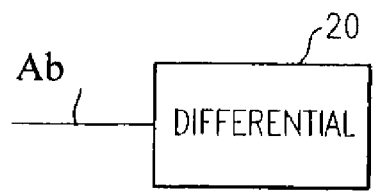
FIG. 4 is a schematic illustration of a differential provided on the output.

On the input side or on the output side, an axle differential and/or a transfer case 20 may be provided according to the invention, as seen in FIG. 4.

Figure 5:
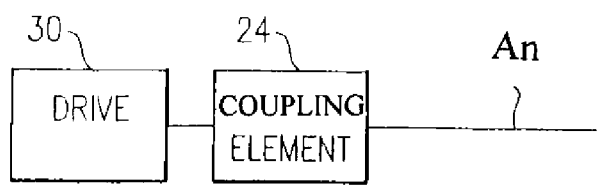
FIG. 5 is a schematic illustration of an input shaft separated from a drive motor by a coupling element.
Figure 6:
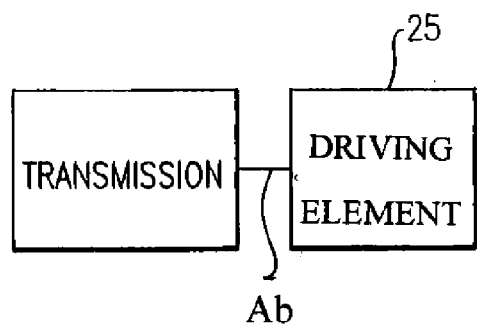
FIG. 6 is a schematic illustration of a driving element located downstream of the transmission according to the invention.
Figure 7:
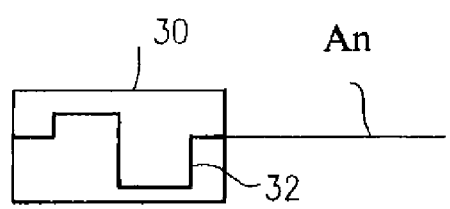
FIG. 7 is a schematic illustration of an input permanently coupled to a crankshaft of a drive engine.

Within the scope of an advantageous refinement, as seen in FIG. 5, the input shaft may be separated from a drive engine 30 as needed by a coupling element 20, whereby the coupling element may be a hydrodynamic converter, a hydraulic clutch, a dry starting clutch, a wet starting clutch, a magnetic powder clutch, or a centrifugal clutch. It is also possible, as seen in FIG. 6, to provide such a driving element 25 in the power flow direction downstream of the transmission, whereby, as seen in FIG. 7, in this case the input shaft is permanently connected to the crankshaft 32 of the engine 30.

Figure 8:
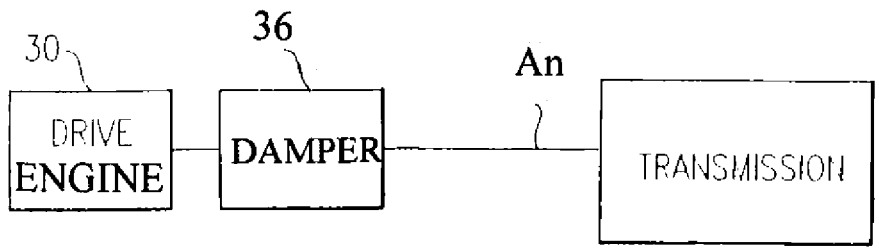
FIG. 8 is a schematic illustration of a vibration damper arranged between drive engine and the transmission according to the invention.

The multi-speed transmission according to the invention, as seen in FIG. 8, also allows to provide a torsional vibration damper 36 between the engine 30 and transmission.

Figure 9:
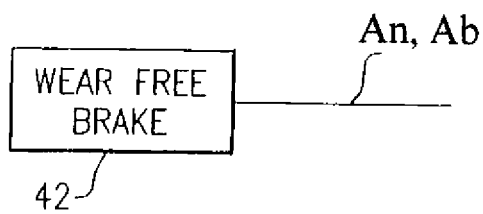
FIG. 9 is a schematic illustration of a wear-free brake arranged on a shaft.
Figure 10:
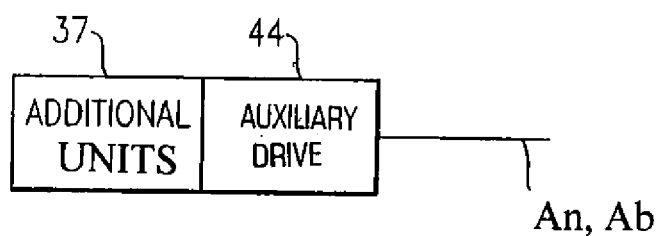
FIG. 10 is a schematic illustration of an auxiliary drive arranged on a shaft for driving an additional unit.

Within the scope of a further embodiment of the invention, as seen in FIG. 9, a wear-free brake 42, such as a hydraulic or electric retarder or the like, may be arranged on the input shaft or the output shaft, which is particularly important when the transmission is used in commercial vehicles. Furthermore, an auxiliary drive 44 may be provided on each shaft, preferably on the input shaft or the output shaft, to drive additional units 37, as seen in FIG. 10.

The shifting elements used may be configured as load-shifting clutches or brakes. In particular, load-shifting clutches or brakes such as multi-disk clutches, band brakes and/or cone clutches may be used. Furthermore, it is also possible to use positive brakes and/or clutches, such as synchronization devices or claw clutches, as the shifting elements. According to the invention, the shifting elements can be actuated hydraulically, pneumatically, or by electric motor.

Figure 11:
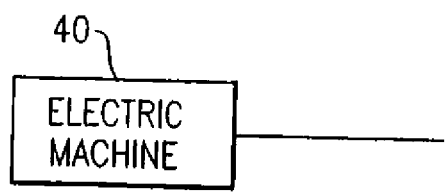
FIG. 11 is a schematic illustration of an electric machine provided on a shaft.

A further advantage of the multi-speed transmission presented here, as seen in FIG. 11, is that an electric machine 40 can be provided on each shaft as a generator and/or as an additional drive unit.

Of course, any design configuration, particularly any spatial configuration of the planetary gear sets and the shifting elements as such as well as in relation to each other, to the extent they are technically expedient, falls under the scope of protection of the present claims, without influencing the function of the transmission as described in the claims, even if these embodiments are not explicitly illustrated in the figures or mentioned in the description.

REFERENCE NUMERALS

1 Shaft
2 Shaft
3 Shaft
4 Shaft
5 Shaft
6 Shaft
7 Shaft
8 Shaft
03 Brake
04 Brake
05 Brake
48 Clutch
67 Clutch
78 Clutch
P1 Planetary gear set
P2 Planetary gear set
P3 Planetary gear set
P4 Planetary gear set
An Input
Ab Output
i Gear ratio
phi Progressive ratio
G Housing

The invention claimed is:

1. A multi-speed automatic transmission of planetary design for a motor vehicle, the transmission comprising:
an input (An) and an output (Ab) which are arranged in a housing (G) of the transmission;
first, second, third and fourth planetary gear sets (P1, P2. P3, P4), each of the first, the second, the third and the fourth planetary gear sets (P1, P2, P3, P4) comprises at least a sun gear, a planet carrier and a ring gear;
at least first, second, third, fourth, fifth, sixth, seventh and eighth rotatable shafts (1, 2, 3, 4, 5, 6, 7, 8);
at least six shifting elements (03, 04, 05, 48, 67, 78) comprising first, second and third brakes (03, 04, 05) and first, second and third clutches (48, 67, 78), and selective engagement of the at least six shifting elements (03, 04, 05, 48, 67, 78) creates different gear ratios between the input (An) and the output (Ab) such that at least six forward gears and three reverse gears can be implemented;
the first shaft (1) being integrally coupled to the input (An) and the planet carrier of the first planetary gear set (P1);
the second shaft (2) being integrally coupled to the output (Ab), the planet carrier of the third planetary gear set (P3) and the planet carrier of the fourth planetary gear set (P4);
the third shaft (3) being integrally coupled to the ring gear of the second planetary gear set (P2) and the sun gear of the first planetary gear set (P1);
the fourth shaft (4) being integrally coupled to the ring gear of the third planetary gear set (P3) and the sun gear of the fourth planetary gear set (P4);
the fifth shaft (5) being integrally coupled to the ring gear of the fourth planetary gear set (P4);
the sixth shaft (6) being integrally coupled to the sun gear of the second planetary gear set (P2) and the ring gear of the first planetary gear set (P1);
the seventh shaft (7) being integrally coupled to the sun gear of the third planetary gear set (P3);
the eighth shaft (8) being integrally coupled to the planet carrier of the second planetary gear set (P2);
the first brake (03) detachably coupling the third shaft (3) to the housing (G) of the transmission;
the second brake (04) detachably coupling the fourth shaft (4) to the housing (G) of the transmission;
the third brake (05) detachably coupling the fifth shaft (5) to the housing (G) of the transmission;
the first clutch (48) detachably coupling the fourth shaft (4) to the eighth shaft (8);
the second clutch (67) detachably coupling the sixth shaft (6) to the seventh shaft (7); and
the third clutch (78) detachably coupling the seventh shaft (7) to the eighth shaft (8).

2. The multi-speed transmission according to claim 1, wherein the first, the second, the third and the fourth planetary gear sets (P1, P2, P3, P4) are arranged in an axial direction in the sequence of:
the first planetary gear set (P1), the second planetary gear set (P2), the third planetary gear set (P3) and the fourth planetary gear set (P4).

3. The multi-speed transmission according to claim 1, wherein the first, the second, the third and the fourth planetary gear sets (P1, P2, P3, P4) are each minus planetary gear sets.

4. The multi-speed transmission according to claim 1, wherein the third clutch (78) and the second clutch (67) are axially arranged between the second planetary gear set (P2) and the third planetary gear set (P3).

5. The multi-speed transmission according to claim 1, wherein the third clutch (78) and the second clutch (67) are multi-disk clutches and have a common outer disk carrier.

6. The multi-speed transmission according to claim 1, wherein the first clutch (48) is axially arranged between the second planetary gear set (P2) and the third planetary gear set (P3).

7. The multi-speed transmission according to claim 6, wherein an outer disk carrier of the first clutch (48) is located radially outwardly of the third clutch (78) and the second clutch (67).

8. The multi-speed transmission according to claim 1, wherein
a first forward gear is implemented by engagement of the first brake (03), the third clutch (78), and the second brake (04);
a second forward gear is implemented by engagement of the second brake (04), the second clutch (67), and the third clutch (78);
a third forward gear is implemented by engagement of the second brake (04), the second clutch (67) and the first brake (03);
a fourth forward gear is implemented by engagement of the first clutch (48), the second brake (04), and the second clutch (67);
a fifth forward gear is implemented by engagement of the first clutch (48), the second clutch (67) and the first brake (03); and
a sixth forward gear is implemented by engagement of the first clutch (48), the second clutch (67), and the third clutch (78).

9. The multi-speed transmission according to claim 1, wherein
a first reverse gear is implemented by engagement of the first brake (03), the third brake (05) and the third clutch (78);

a second reverse gear is implemented by engagement of the third brake (05), the second clutch (67) and the third clutch (78); and a third reverse gear is implemented by engagement of the first brake (03), the third brake (05) and the second clutch (67).

10. The multi-speed transmission according to claim 1, wherein a one way clutch is arranged between the housing (G) and at least one of the first shaft (1), the second shaft (2), the third shaft (3), the fourth shaft (4), the fifth shaft (5), the sixth shaft (6), the seventh shaft (7) and the eighth shaft (8).

11. The multi-speed transmission according to claim 1, wherein the input and the output are located on a common side of the housing.

12. The multi-speed transmission according to claim 1, wherein at least one of an axle differential and a transfer case is located either on the input or the output.

13. The multi-speed transmission according to claim 1, wherein a coupling element is located between a drive engine and the input (An).

14. The multi-speed transmission according to claim 13, wherein the coupling element is one of a hydrodynamic converter, a hydraulic clutch, a dry starting clutch, a wet starting clutch, a magnetic powder clutch and a centrifugal clutch.

15. The multi-speed transmission according to claim 13, wherein an external driving element is arranged, in a power flow direction, downstream of the transmission and the input (An) is connected to a crankshaft of the engine.

16. The multi-speed transmission according to claim 1, wherein starting occurs by a shifting element (03, 78) of the transmission, and the input (An) is permanently connected to the crankshaft of the drive engine.

17. The multi-speed transmission according to claim 1, wherein a torsional vibration damper is arranged between a drive engine and the transmission.

18. The multi-speed transmission according to claim 1, wherein a wear-free brake is arranged on at least one of the first shaft (1), the second shaft (2), the third shaft (3), the fourth shaft (4), the fifth shaft (5), the sixth shaft (6), the seventh shaft (7) and the eighth shaft (8).

19. The multi-speed transmission according to claim 1, wherein an auxiliary drive is arranged on at least one of the first shaft (1), the second shaft (2), the third shaft (3), the fourth shaft (4), the fifth shaft (5), the sixth shaft (6), the seventh shaft (7) and the eighth shaft (8) for driving an additional unit.

20. The multi-speed transmission according to claim 1, wherein each of the at least six shifting elements (03, 04, 05, 48, 67, 78) is one of either a load-shifting clutch and a load-shifting brake.

21. The multi-speed transmission according to claim 1, wherein each of the at least six shifting elements (03, 04, 05, 48, 67, 78) is one of a multi-disk clutch, a band brake and a cone clutch.

22. The multi-speed transmission according to claim 1, wherein each of the at least six shifting elements (03, 04, 05, 48, 67, 78) is one of a positive clutch and a positive brake.

23. The multi-speed transmission according to claim 1, wherein an electric machine is located on at least one of the first shaft (1), the second shaft (2), the third shaft (3), the fourth shaft (4), the fifth shaft (5), the sixth shaft (6), the seventh shaft (7) and the eighth shaft (8) and is at least one of a generator and an additional drive unit.

\* \* \* \* \*